US010120576B2

(12) United States Patent
Manzanares et al.

(10) Patent No.: US 10,120,576 B2
(45) Date of Patent: Nov. 6, 2018

(54) STORAGE CLUSTER AND METHOD THAT EFFICIENTLY STORE SMALL OBJECTS WITH ERASURE CODES

(71) Applicant: HGST Netherlands B.V., Amsterdam (NL)

(72) Inventors: Adam Manzanares, Union City, CA (US); Lluis Pamies-Juarez, San Jose, CA (US); Cyril Guyot, San Jose, CA (US); Koen De Keyser, Westrem (BE); Mark Christiaens, Aalter (BE); Robert Mateescu, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 210 days.

(21) Appl. No.: 15/065,025

(22) Filed: Mar. 9, 2016

(65) Prior Publication Data
US 2017/0262187 A1    Sep. 14, 2017

(51) Int. Cl.
G06F 3/06    (2006.01)

(52) U.S. Cl.
CPC .......... *G06F 3/0608* (2013.01); *G06F 3/0643* (2013.01); *G06F 3/0647* (2013.01); *G06F 3/0653* (2013.01); *G06F 3/0656* (2013.01); *G06F 3/0661* (2013.01); *G06F 3/0673* (2013.01)

(58) Field of Classification Search
CPC ................... G06F 3/068; G06F 3/0685; G06F 12/00–12/16; G06F 2212/205; G06F 2212/217; G06F 2212/225
See application file for complete search history.

(56) References Cited

U.S. PATENT DOCUMENTS

| 7,451,261 | B2* | 11/2008 | Saito | G06F 3/0611 710/52 |
| 8,631,198 | B2* | 1/2014 | Ng | G06F 12/0893 711/113 |
| 2006/0209444 | A1* | 9/2006 | Song | G06F 3/0625 360/31 |
| 2008/0052537 | A1* | 2/2008 | Nishizono | G06F 21/78 713/193 |
| 2009/0157923 | A1* | 6/2009 | Puishys, Jr. | G06F 11/3409 710/104 |
| 2017/0097782 | A1* | 4/2017 | Ramalingam | G06F 3/0616 |

* cited by examiner

*Primary Examiner* — Nicholas Simonetti
(74) *Attorney, Agent, or Firm* — Patent Law Works LLP

(57) ABSTRACT

Small objects are efficiently stored with erasure codes by combining a small object with other small objects and/or large objects to form a single large object for chunking, and providing early notification of permanent storage to the sources of the objects to prevent small objects from becoming stale while waiting for additional objects to be combined.

20 Claims, 3 Drawing Sheets

STORAGE CLUSTER AND METHOD THAT EFFICIENTLY STORE SMALL OBJECTS WITH ERASURE CODES

BACKGROUND OF THE INVENTION

1. Field of the Invention

The present invention relates to storage clusters and, more particularly, to a storage cluster and method that efficiently store small objects with erasure codes.

2. Description of the Related Art

A storage cluster is a group of hard disk drives that, along with a controller, permanently store digital files, which are often known as objects.

Permanent storage differs from day-to-day storage in that permanent storage must be able to tolerate multiple hard disk drive failures without losing any of the objects that have been stored.

One conventional approach to permanent storage is known as replication. With replication, an object is copied in its entirety onto several hard disk drives. For example, if an object is copied onto three hard disk drives and two of the hard disk drives fail, then the object can be completely recovered from the copy on the third hard disk drive.

Although the statistical likelihood of losing an object can be reduced to near zero, one of the drawbacks of replication is that replication requires a large amount of storage space. For example, if an object is copied onto three hard disk drives, then the effective storage space of the storage cluster is only ⅓ of the total storage space.

Another conventional approach to permanent storage, which requires substantially less storage space than replication, is to store the objects with erasure codes. Erasure codes break an object into k fragments or chunks, which are then encoded (using, for example, a maximum distance separable (MDS) code) into n chunks of the same size, where n is greater than k, and any k chunks of the n chunks are enough to recover the complete object. The n chunks are then stored on n hard disk drives.

One common approach to permanently storing objects with erasure codes is to temporarily store the objects with replication in a number of replication storage spaces on a number of hard disk drives and then, when the system has spare resources or at predefined times, chunk the objects, encode the chunks, and store the encoded chunks on the hard disk drives. With this replicate-then-encode approach, small objects can be collapsed into larger encodes in order to have efficient encoding and hard drive usage.

After the temporarily-stored objects have been chunked, encoded, and stored on the hard disk drives, the replication storage spaces are reused to temporarily store new copies of objects. Since the replication storage space is reusable, the storage space required for replication with this approach is much smaller than the storage space required for straight replication. Although much smaller than straight replication, this replicate-then-encode approach still requires large replication storage spaces.

Another common approach to permanently storing objects with erasure codes is to chunk, encode, and store the encoded chunks on the hard disk drives as the objects are received by the storage cluster. Since no replication is used with this encode-now approach, this approach requires much less storage space than the previous replicate-then-encode approach.

However, one disadvantage of the encode-now approach is that small objects are chunked into very small sizes, encoded, and permanently stored on the hard disk drives within the storage cluster. Very small encoded chunks are undesirable because it is very inefficient to store and repair very small encoded chunks on the long circular tracks of the hard disk drives.

Thus, there is a need for a storage cluster that more efficiently stores small objects with erasure codes than the encode-now approach without requiring substantially more storage space.

SUMMARY OF THE INVENTION

The present invention provides a storage cluster that efficiently stores small objects with erasure codes. The storage cluster of the present invention includes a number of permanent storage units, and a controller coupled to the permanent storage units. The controller has an input buffer and a non-volatile temporary memory. The controller receives an object, and determines if the object is larger than an unused portion of the input buffer. The controller also permanently stores the object in the permanent storage units when the input buffer is empty and the object is larger than the unused portion of the input buffer. The controller further permanently stores the object and all objects in the input buffer in the permanent storage units when the input buffer is partially full and the object is larger than the unused portion of the input buffer. In addition, the controller monitors a waiting time to detect a latency condition where the object has been waiting in the input buffer for more than a predefined time. Further, the controller automatically copies object data from the input buffer into the non-volatile temporary memory when the latency condition is detected. The controller also automatically notifies a source of object data that was copied that the object data that was copied has been permanently stored in response to automatically copying object data.

The present invention further provides a method of operating a storage cluster that includes receiving an object, and determining if the object is larger than an unused portion of an input buffer. The method also permanently stores the object in a plurality of non-volatile permanent memories when the input buffer is empty and the object is larger than the unused portion of the input buffer. The method further permanently stores the object and all objects in the input buffer in the non-volatile permanent memories when the input buffer is partially full and the object is larger than the unused portion of the input buffer. In addition, the method monitors a waiting time to detect a latency condition where the object has been waiting in the input buffer for more than a predefined time, and automatically copies object data from the input buffer into a non-volatile temporary memory when the latency condition is detected. Further, the method automatically notifies a source of object data that was copied that the object data that was copied has been permanently stored in response to automatically copying object data.

The present invention also provides a method of operating a controller that includes receiving an object, and determining if the object is larger than an unused portion of an input buffer. The method also includes chunking the object to form single-object chunks, and encoding the single-object chunks to form encoded single-object chunks when the input buffer is empty and the object is larger than the unused portion of the input buffer. The method further includes chunking the object and all objects in the input buffer as a single combined object to form combined chunks, and encoding the combined chunks to form combined encoded chunks when the input buffer is partially full and the object is larger than the unused portion of the input buffer. In addition, the method includes monitoring a waiting time to detect a latency condition where the object has been waiting in the input buffer for more than a predefined time. Further, the method includes automatically copying object data from the input buffer into a non-volatile temporary memory when the latency condition is detected. The method also includes automatically notifying a source of object data that was copied that the object data that was copied has been permanently stored in response to automatically copying object data.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
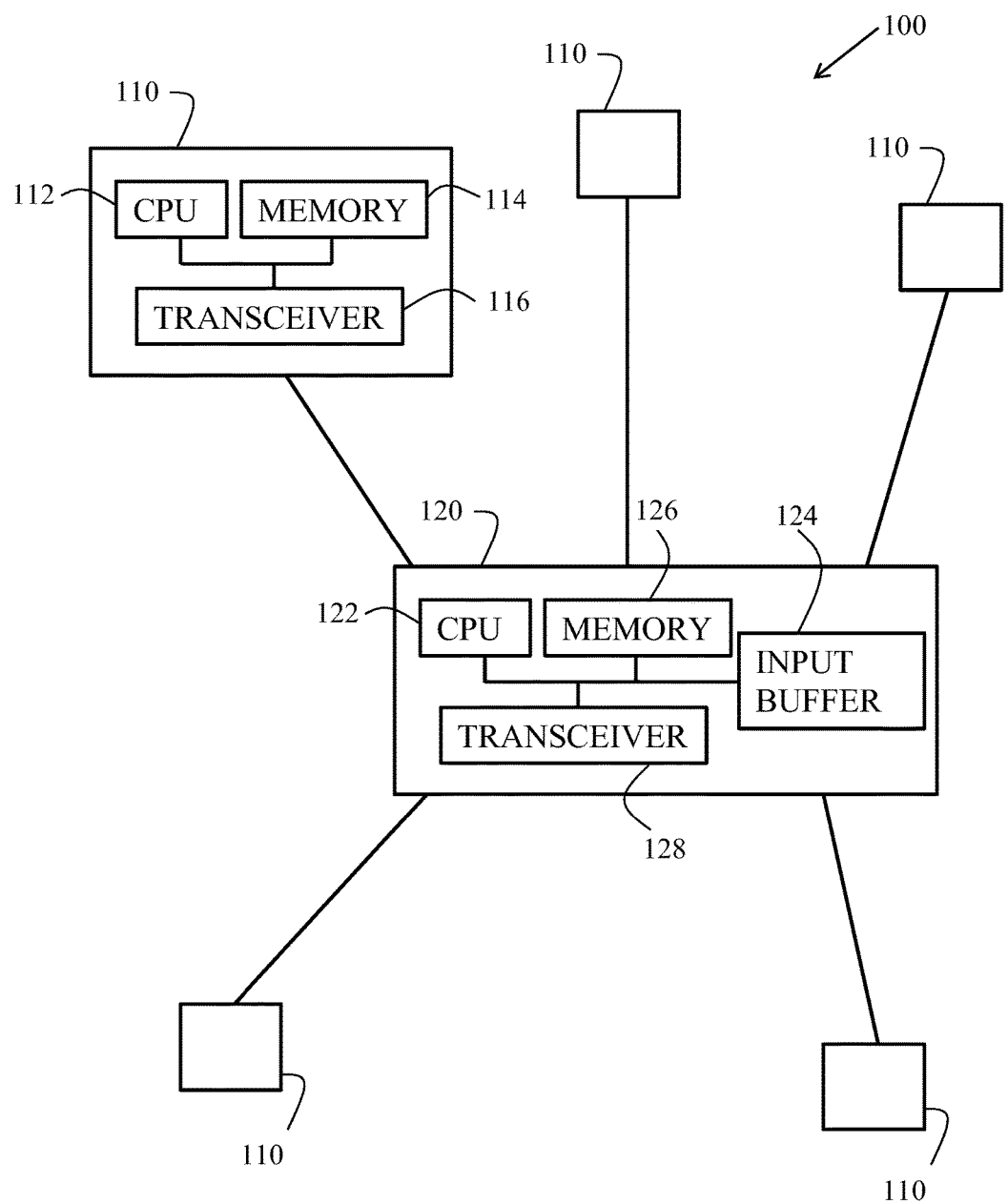
FIG. 1 is a block diagram illustrating an example of a storage cluster 100 in accordance with the present invention.

FIG. 1 shows a block diagram that illustrates an example of a storage cluster 100 in accordance with the present invention. As described in greater detail below, storage cluster 100 efficiently stores small objects with erasure codes by combining small objects with other small objects and/or large objects to form a single large object for chunking, and providing early notification of permanent storage to prevent small objects from becoming stale while waiting for additional objects to be combined.

As shown in FIG. 1, storage cluster 100 includes a group of permanent storage units 110. The permanent storage units 110 can be implemented with one or more non-volatile storage devices, or can alternately include one or more non-volatile storage devices (or other non-volatile devices).

In the present example, the permanent storage units 110 include a central processing unit (CPU) 112, a non-volatile permanent memory 114 that is coupled to CPU 112, and a transceiver 116 that is coupled to CPU 112 and non-volatile permanent memory 114. In addition, CPU 112 is implemented with a conventional processor, while each non-volatile permanent memory 114 is implemented with one or more hard disk drives.

Other non-volatile memories, such as flash, phase-change memory (PCM), or hybrid memory, can alternately be used in lieu of the hard disk drives, but these memories typically suffer from one or more drawbacks when used in a permanent storage system, such as shorter life cycle, higher cost, or lower maximum capacity.

Transceiver 116 is implemented with conventional transmitter-receiver circuitry that transmits and receives data across an external medium, such as a dedicated line, a local network, or the internet. In the present example, transceiver 116 receives chunks encoded with erasure codes, while CPU 112 stores the encoded chunks in memory 114.

As further shown in FIG. 1, storage cluster 100 also includes a controller 120 that is coupled to each of the permanent storage units 110. The permanent storage units 110 can be located locally, remotely, or any combination of locally and remotely. Controller 120 includes a CPU 122 and an input buffer 124 that is coupled to CPU 122. In addition, controller 120 also includes a non-volatile temporary memory 126 that is coupled to CPU 122 and input buffer 124, and a transceiver 128 that is coupled to CPU 122, input buffer 124, and non-volatile temporary memory 126.

In the present example, CPU 122 is implemented with a conventional processor, while input buffer 124 is implemented with a random access memory (RAM), which is a volatile memory. Further, non-volatile temporary memory 126 is implemented with PCM, flash, or a similar type memory. (Controller 120 also has regular access to dynamic RAM (DRAM).) Alternately, other types of non-volatile memories can also be used. (Hard disk drives can be used, although a faster non-volatile memory is preferred.) Memory 126 can be located locally or remotely.

Transceiver 128 is implemented with a conventional transmitter-receiver circuit that transmits data and objects to and receives data and objects from the permanent storage units 110 across an external medium, such as a dedicated line, a local network, or the internet. The transmitter-receiver circuit also transmits data and objects to and receives data and objects from a number of object sources, such as client computers, across an external medium, such as a dedicated line, a local network, or the internet.

Figure 2:
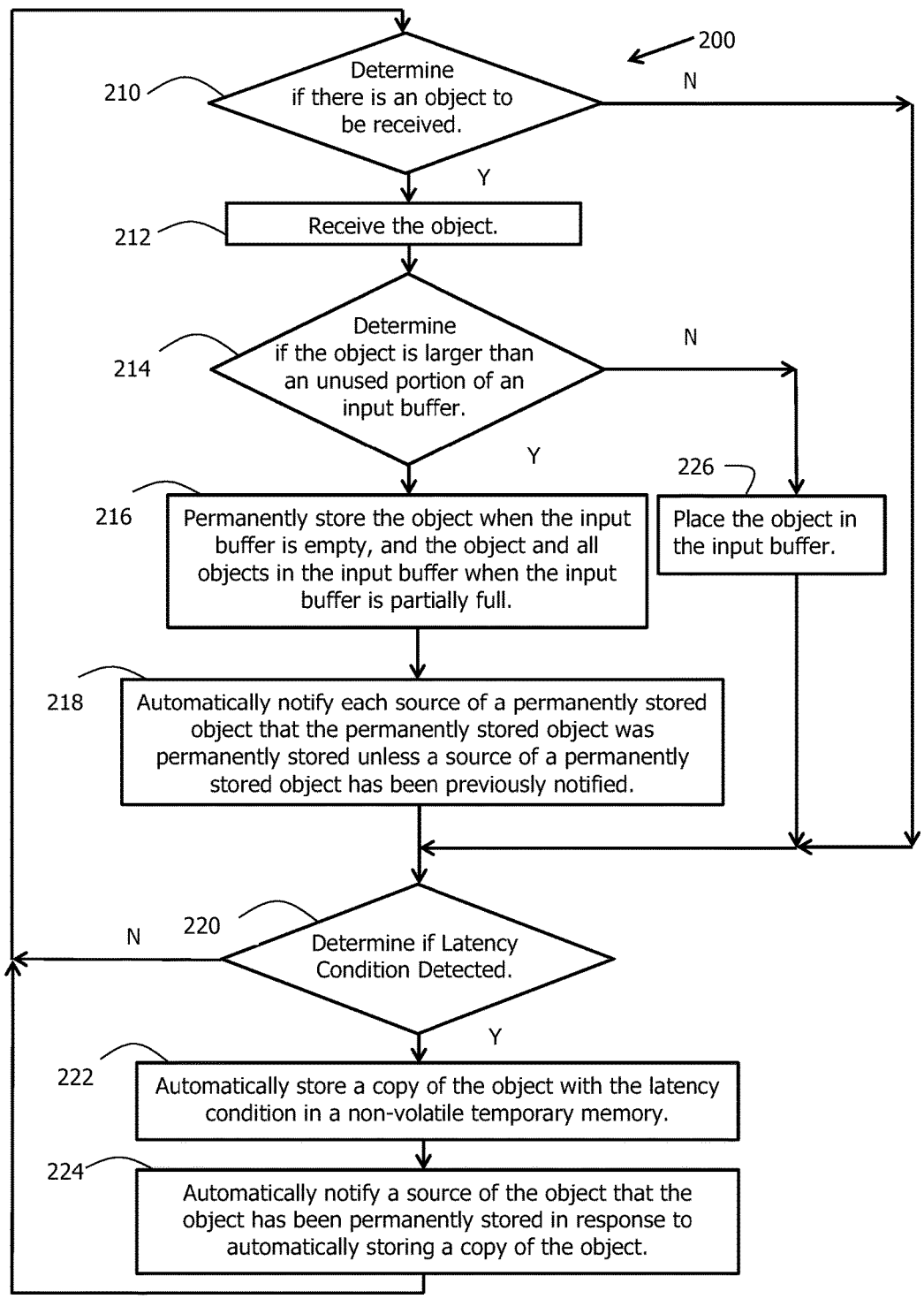
FIG. 2 is a flow chart illustrating an example of a method 200 of operating a storage cluster in accordance with the present invention.

FIG. 2 shows a flow chart that illustrates an example of a method 200 of operating a storage cluster in accordance with the present invention. As shown in FIG. 2, method 200 begins at 210 by determining if there is an object to be received from a source, such as a client computer. When there is an object to be received, method 200 moves from 210 to 212 to receive the object, and then to 214 to determine if the object is larger than an unused portion of an input buffer, such as input buffer 124.

When the object is larger than the unused portion of the input buffer, method 200 moves from 214 to 216. In 216, method 200 permanently stores the object in a number of permanent memories when the input buffer is empty. Method 200 also combines together and permanently stores the object and all of the objects in the input buffer in a number of permanent memories when the input buffer is partially full.

The object or objects in the input buffer are permanently stored by fragmenting or chunking a single object, or combining multiple objects together and chunking the multiple objects as though the multiple objects were a single object, into k chunks. The k chunks are next encoded with an erasure code, such as the MDS code, to form n encoded chunks. The n encoded chunks are transferred to a number of permanent storage units, such as the permanent storage units 110, for permanent storage on n hard disk drives. In the present example, the permanent storage units 110 receive the encoded chunks, and then store the encoded chunks on the hard disk drives. K and n are integers, where n is larger than k.

After the object or objects in the input buffer have been permanently stored, method 200 moves from 216 to 218 to automatically notify each source of a permanently stored object that the object was permanently stored, unless the source of a permanently stored object has been previously notified that the object was permanently stored.

Following this, method 200 moves from 218 to 220 to determine if any latency condition has been detected. A latency condition occurs when an object in the input buffer has been waiting for more than a predefined time, such as 100 ms, for another object to be received that is larger than the unused portion of the input buffer.

Each object in the input buffer has a latency condition, which can be detected by monitoring a waiting time that measures how long an object has been waiting in the input buffer to be permanently stored. The waiting time can be measured with a timer that starts when the object is first placed into the input buffer.

When no latency condition is detected, method 200 returns to 210. When a latency condition is detected, method 200 moves from 220 to 222 to automatically store object data from the input buffer into a non-volatile temporary memory, such as non-volatile temporary memory 126, which removes the latency condition from that object.

In a first embodiment, method 200 in 222 automatically stores a copy of the object with the latency condition in the non-volatile temporary memory. In a second embodiment, method 200 in 222 automatically stores a copy of a predefined amount of objects, such as 4 MB of buffered objects, from the input buffer into the non-volatile temporary memory in response to a latency condition.

As a result, the object or objects are stored in both the input buffer and the non-volatile temporary memory. (The object can also be optionally further replicated.) However, although the object or objects have been copied (replicated) and temporarily stored at least once after a latency condition was detected, at this point the object or objects have not been permanently stored (which includes encoding) on the hard disk drives. After this, method 200 moves from 222 to 224 to automatically notify a source of the object data that was copied that the object data that was copied has been permanently stored in response to automatically copying the object data into the non-volatile temporary memory. After this, method 200 returns to 210 to again determine if there are objects to be received.

Notifying the source of an object, e.g., a client computer, that the object has been permanently stored in the hard disk drives before the object has been permanently stored in the hard disk drives allows the source of the object to move on without the need to wait for a notification which, in turn, is waiting for an object to be received that is larger than the unused portion of input buffer 124. When the source of an object is notified early that the object has been permanently stored (notice based on the temporary copy), the source of the object is not notified again in 218.

When there is no object to be received in 210, method 200 moves to 220 to determine if a latency condition has been detected. In addition, when the object is not larger than the unused portion of the input buffer, method 200 moves from 214 to 226 to place the object in the input buffer, and then to 220 to determine if a latency condition has been detected. As a result, method 200 monitors the latency condition.

Thus, when input buffer 124 is empty and storage cluster 100 receives an object that is larger than input buffer 124, the object is chunked, encoded, and stored on the hard disk drives as it is received by storage cluster 100. However, when storage cluster 100 receives an object that smaller than the unused portion of input buffer 124, storage cluster 100 places the object in input buffer 124 until one or more additional objects are received that, in combination, are larger than input buffer 124. Once an object and all of the objects in input buffer 124 are larger than input buffer 124, storage cluster 100 chunks the objects as though the objects were a single object. Storage cluster 100 then encodes and stores the chunks in the hard disk drives.

In addition, to prevent the source of a small object, such as a client computer, from having to wait for an object to be received that is larger than the unused portion of input buffer 124, storage cluster 100 replicates the small object one or more times after the predefined time to provide temporary failure-resistant storage, and sends a notification to the source of the small object that the object has been permanently stored.

In the event that the object or objects placed in input buffer 124 are lost, such as with a power failure, the objects in input buffer 124 for which a notification of permanent storage has been sent can be recovered from non-volatile temporary memory 126, while the remaining objects can be retransmitted from the sources of the objects. Thus, non-volatile temporary memory 126 is a "permanent" memory in the sense that memory 126 protects objects in input buffer 124 from being lost.

One of the advantages of the present invention is that the only objects that are replicated and placed in non-volatile temporary memory 126 are objects that are smaller than the unused portion of input buffer 124. As a result, non-volatile temporary memory 126 (as well as each additional non-volatile temporary memory if additional replication is used) need be no bigger than input buffer 124. Thus, the total storage space that is required by storage cluster 100 is only slightly more than the total storage space required by the encode-now approach, and substantially less than the total storage space required by the replicate-then-encode approach.

Another advantage of this approach is that smaller objects can be grouped together and stored as large chunks of data, which allows the hard disk drives to operate with an optimal throughput. Storage cluster 100 only chunks data equal to or larger than the size of input buffer 124, and therefore eliminates the problem of chunking and encoding small objects, which is a disadvantage of a storage cluster that utilizes the encode-now approach.

Figure 3:
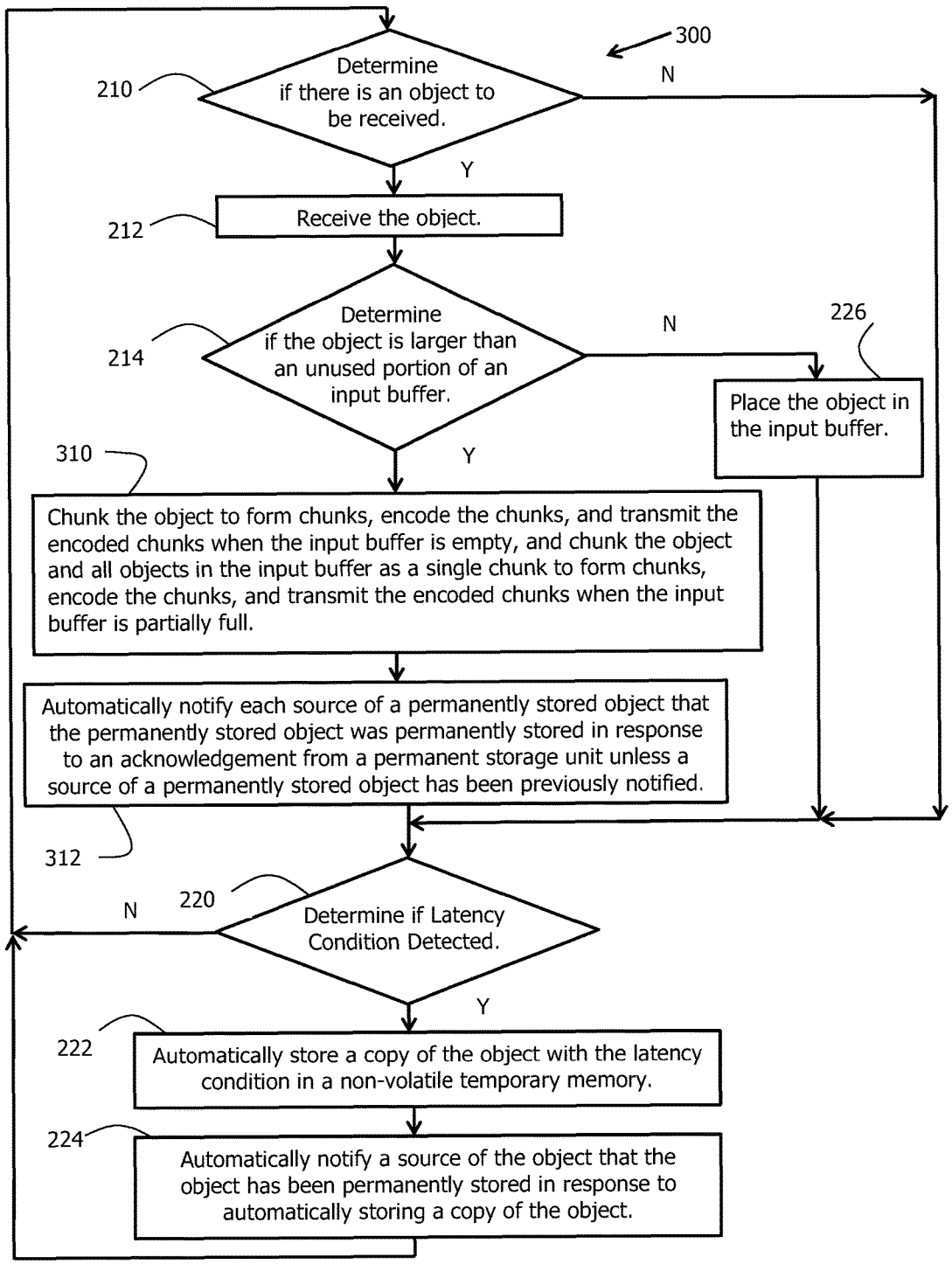
FIG. 3 is a flow chart illustrating an example of a method 300 of operating a controller in accordance with the present invention.

FIG. 3 shows a flow chart that illustrates an example of a method 300 of operating a controller in accordance with the present invention. Method 300 is similar to method 200 and, as a result, utilizes the same reference numerals to designate the elements that are common to both methods.

As shown in FIG. 3, method 300 differs from method 200 in that method 300 utilizes 310 in lieu of 216. Thus, when the input buffer is empty and the object is larger than the unused portion of the input buffer, method 300 moves from 214 to 310 to chunk the object to form k chunks, encode the k chunks to form n chunks, and transmit the encoded n chunks to the permanent storage units, such as the permanent storage units 110, for permanent storage.

When the input buffer is partially full and the object is larger than the unused portion of the input buffer, method 300 combines together the object and all of objects in the input buffer as a single object, chunks the single object, encodes the chunks, and transmits the encoded chunks to the permanent storage units for permanent storage.

Method 300 also differs from method 200 in that method 300 utilizes 312 in lieu of 218. Method 300 moves from 310 to 312 to automatically notify each source of a permanently stored object that the object was permanently stored in response to an acknowledgement from a permanent storage unit, such as a permanent storage unit 110, that the objects were stored, unless the source of a permanently stored object has been previously notified due to a latency condition that the object was permanently stored.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A storage cluster comprising:
   a number of permanent storage units; and
   a controller coupled to the number of permanent storage units, the controller having an input buffer and a non-volatile temporary memory, the controller configured to:
   receive a first object;
   determine that the first object is smaller than an unused portion of the input buffer;
   add the first object to the input buffer, thereby decreasing the unused portion of the input buffer;
   responsive to a latency condition occurring:
     copy object data including the first object from the input buffer to the non-volatile temporary memory, and
     automatically notify a source of the first object that the first object has been permanently stored,
     wherein the latency condition occurs when the first object waits in the input buffer for more than a predefined time;
   receive a second object;
   responsive to a determination that the second object is larger than the unused portion of the input buffer that includes the first object, permanently store the second object, and all objects in the input buffer including the first object, in the permanent storage units using erasure codes; and
   automatically notify a source of the second object that the second object has been permanently stored.

2. The storage cluster of claim 1, wherein copying the object data creates a temporary copy of the first object in the non-volatile temporary memory.

3. The storage cluster of claim 2, wherein a source of the first object is notified of a permanent storage of the first object subsequent to a creation of the temporary copy of the first object in the non-volatile temporary memory and prior to permanently storing the first object in the permanent storage units.

4. The storage cluster of claim 1, wherein the object data copied to the non-volatile temporary memory responsive to the latency condition occurring is of a predefined amount of data.

5. The storage cluster of claim 1, wherein permanently storing the second object, and all objects in the input buffer including the first object, in the permanent storage units using erasure codes includes:
   combining the second object, and all objects in the input buffer including the first object, into a single object;
   chunking the single object into a number of chunks;
   encoding the number of chunks to form a number of erasure-encoded chunks; and
   transferring the number of erasure-encoded chunks to the permanent storage units, wherein the permanent storage units permanently store the number of erasure-encoded chunks.

6. The storage cluster of claim 1, wherein the input buffer is a volatile memory.

7. The storage cluster of claim 1, wherein the controller is further configured to:
   receive a third object that is larger than the input buffer, wherein the input buffer is empty; and
   permanently store the third object in the permanent storage units using erasure codes.

8. A method of operating a storage cluster, the method comprising:
   receiving a first object;
   determining that the first object is smaller than an unused portion of an input buffer;
   adding the first object to the input buffer, thereby decreasing the unused portion of the input buffer;
   responsive to a latency condition occurring:
     copying object data including the first object from the input buffer to a non-volatile temporary memory, and
     automatically notifying a source of the first object that the first object has been permanently stored,
     wherein the latency condition occurs when the first object waits in the input buffer for more than a predefined time;
   receiving a second object;
   responsive to a determination that the second object is larger than the unused portion of the input buffer that includes the first object, permanently storing the second object, and all objects in the input buffer including the first object, in non-volatile permanent memories using erasure codes; and
   automatically notifying a source of the second object that the second object has been permanently stored.

9. The method of claim 8, wherein copying the object data creates a temporary copy of the first object in the non-volatile temporary memory.

10. The method of claim 8, wherein the object data copied to the non-volatile temporary memory responsive to the latency condition occurring is of a predefined amount of data.

11. The method of claim 8, wherein a source of the first object is notified of a permanent storage of the first object subsequent to a creation of a temporary copy of the first object in the non-volatile temporary memory and prior to permanently storing the first object in the non-volatile permanent memories.

12. The method of claim 8, wherein permanently storing the second object, and all objects in the input buffer including the first object, in the non-volatile permanent memories using erasure codes includes:
    combining the second object, and all objects in the input buffer including the first object, into a single object;
    chunking the single object into a number of chunks;
    encoding the number of chunks to form a number of erasure-encoded chunks; and
    transferring the number of erasure-encoded chunks to a number of non-volatile permanent memories, wherein the non-volatile permanent memories permanently store the number of erasure-encoded chunks.

13. The method of claim 8, wherein the input buffer is a volatile memory.

14. The method of claim 8, further comprising:
    receiving a third object that is larger than the input buffer, wherein the input buffer is empty; and
    permanently storing the third object in the non-volatile permanent memories using erasure codes.

15. A method of operating a controller, the method comprising:
    receiving a first object that is smaller than an unused portion of an input buffer;
    adding the first object to the input buffer, thereby decreasing the unused portion of the input buffer;
    responsive to a latency condition occurring:
      copying object data including the first object from the input buffer to a non-volatile temporary memory, and automatically notifying a source of the first object that the first object has been permanently stored,
wherein the latency condition occurs when the first object waits in the input buffer for more than a predefined time;
receiving a second object;
determining that the second object is larger than the unused portion of the input buffer;
chunking the second object and all objects in the input buffer including the first object, as a single combined object, thereby forming combined chunks
encoding the combined chunks to form combined erasure-encoded chunks; and
automatically notifying a source of the second object that the second object has been permanently stored.

16. The method of claim 15, wherein copying the object data creates a temporary copy of the first object in the non-volatile temporary memory.

17. The method of claim 15, wherein the object data copied to the non-volatile temporary memory responsive to the latency condition occurring is of a predefined amount of data.

18. The method of claim 15, wherein a source of the first object is notified of a permanent storage of the first object subsequent to a creation of a temporary copy of the first object in the non-volatile temporary memory and prior to permanently storing the first object in non-volatile permanent memories.

19. The method of claim 15, wherein the input buffer is volatile memory.

20. The method of claim 15, further comprising:
receiving a third object that is larger than the input buffer, wherein the input buffer is empty; and
chunking and erasure-encoding the third object.

* * * * *